United States Patent [19]

Ito et al.

[11] Patent Number: 4,462,695
[45] Date of Patent: Jul. 31, 1984

[54] COMPOSTING APPARATUS

[75] Inventors: Kanichi Ito; Yoshio Hirayama; Ryoichi Takeuchi, all of Kanagawa, Japan

[73] Assignee: Ebara Corporation, Tokyo, Japan

[21] Appl. No.: 524,693

[22] Filed: Aug. 19, 1983

Related U.S. Application Data

[63] Continuation-in-part of Ser. No. 379,996, May 19, 1982, abandoned.

[30] Foreign Application Priority Data

May 22, 1981 [JP] Japan .................................. 56-77806

[51] Int. Cl.³ .......................... B02C 21/02; A01C 3/06
[52] U.S. Cl. .................................................. 366/345
[58] Field of Search ....................... 366/345, 346, 261; 241/101.7, 283; 414/272

[56] References Cited

U.S. PATENT DOCUMENTS 3,364,007 1/1968 Redman .
3,435,967 4/1969 Sackett, Sr. .................... 414/272 X
3,776,528 12/1973 Toto .
3,881,707 5/1975 Toto .

FOREIGN PATENT DOCUMENTS 1917268 10/1970 Fed. Rep. of Germany .
1369124  6/1964 France .
2040347  1/1971 France .
2150496  4/1973 France .
55-158193 9/1980 Japan .
521894  6/1980 United Kingdom .

Primary Examiner—Philip R. Coe
Attorney, Agent, or Firm—Wenderoth, Lind & Ponack

[57] ABSTRACT

A composting method uses an "H"-shaped apparatus comprising four rotatable paddles disposed at each terminal end of the "H"-shaped arrangement, the apparatus as a whole being reversibly movable in the direction of the horizontal bar of the "H" shape. A plurality of composting sections are arranged in a row along and at opposite sides of the horizontal bar. The composting operation is performed for the plurality of sections according to a predetermined schedule so that, when the apparatus is under operation, four sections are simultaneously under operation, one of the four sections may be receiving material and three sections are simultaneously under agitation by the paddles and at the other section or sections the material may be taken away.

2 Claims, 16 Drawing Figures

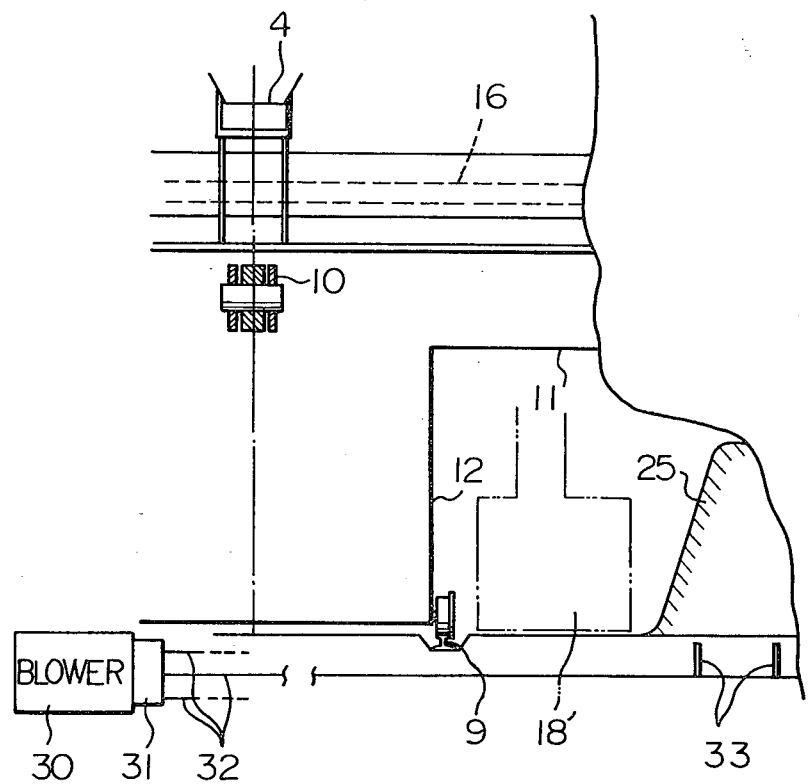

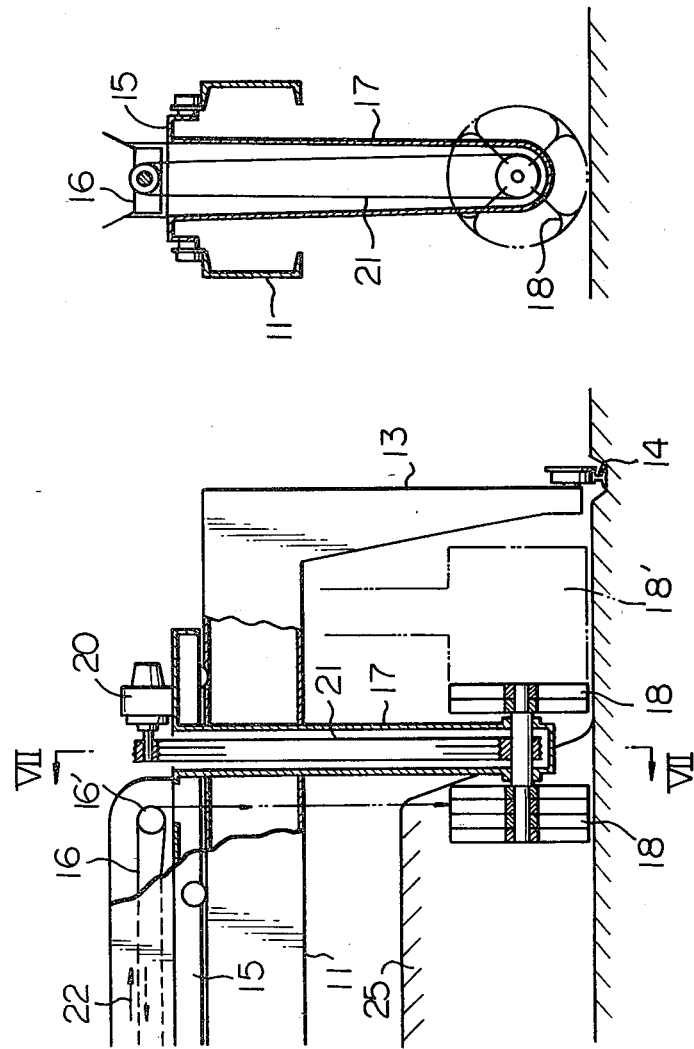

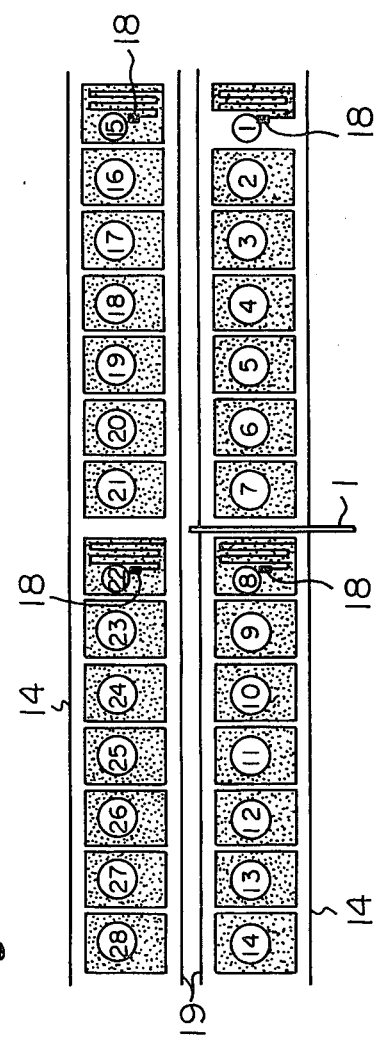
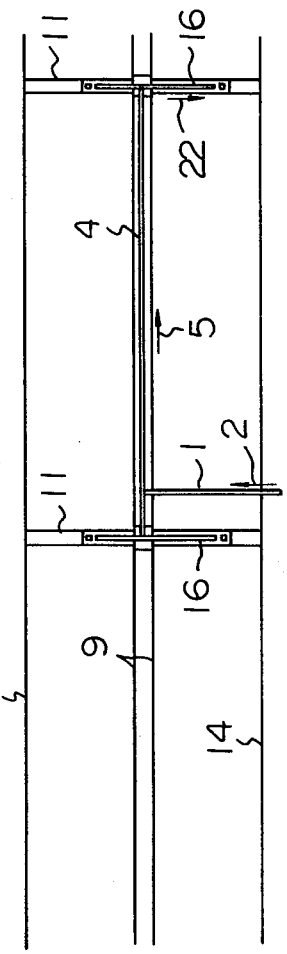
Fig. 10
Fig. 11

COMPOSTING APPARATUS

This is a continuation-in-part of application Ser. No. 379,996, filed May 19, 1982, and now abandoned.

FIELD OF THE INVENTION

The present invention relates generally to treatment of organic waste material and more particularly to a composting method for converting waste material such as municipal waste, sewage sludge, livestock farming waste or the like into useful compost.

BACKGROUND OF THE INVENTION

Composting has been heretofore practiced for organic waste material such as municipal waste, sewage sludge, livestock farming waste or the like by way of aerobic fermentation. As is well known, basic requirements for ensuring the conventional composting operation consist of uniform heaping of the waste material to a certain height and agitation to be conducted at a specific time interval. However, when composting has to be practiced on a large industrial scale, it has been found that an excessively wide area is required for heaping a large volume of waste material for a long period of time and thereby the conveyance of waste material, the heaping of the conveyed material and the agitating of the heaped layer of waste material are performed only with many difficulties.

When waste material is heaped in a layer to a certain height, the bottom portion becomes densely compressed due to the dead weight of the heaped material, resulting in substantially reduced air permeability of the layer, and aerobic fermentation is positively inhibited in such case.

If the height of the heaped layer is low, the total heat generated by fermentation is small compared to that in a thick layer. However, the radiation of heat or heat loss from the surface of the layer becomes large relative to the total heat because the surface area through which heat is radiated is the same. Therefore, if such relative heat loss becomes large, it may not be able to maintain the temperature of the layer at a value suitable for fermentation.

A higher temperature is preferred since fermentation is accelerated and this is completed in a shorter period of time.

As to composting temperature, it is preferable that fermentation be effected at a temperature in the range of 65° to 80° C., while maturing is effected at a temperature in the range of 40° to 50° C. In order to ensure fermentation and maturing at an increased rate it is necessary to maintain an operating temperature higher than atmospheric temperature at any rate. Thus, it is important that an operating temperature be constantly maintained with a proper and uniform thickness of the layer.

Since effective fermentation and maturing is impeded if the heaped layer of waste material is let alone as it is, agitation of the layer of waste material is usually carried out.

Objects of agitation are generally classified into the following categories:

(1) prevention of excessive compression particularly at the bottom of the heaped layer (preventing generation of aerophobic bacteria)
(2) promotion of fermentation and maturing due to exposure to air particularly when no aeration is provided at the lower part of the heaped layer of waste material.

It should be noted that continuous agitation is not required for all cases and agitation is effected at certain time intervals which are determined by the properties of the materials under composting operation, the degree of fermentation and maturing of the composting materials and the thickness of the heaped layers.

Therefore, the frequency or interval of the agitations applied on the heaped layers of the material may range, just for example, from 2 times per day to one time per 7 days or more. However, the time schedule is not to be limited to such range.

Composting apparatuses and methods of the above-mentioned type are disclosed in U.S. patent application Ser. Nos. 150,652 and 254,278.

The methods and apparatuses disclosed in these applications are found to be useful for treating a large volume of waste material, and the apparatuses are constructed so that material is supplied from one side of a rectangular composting area and moves toward the opposite side while agitation is performed, and then after completion of the intended fermentation and maturing composted material is discharged from the opposite side of the composting area. When it becomes necessary to enlarge the composting capacity of the conventional apparatuses as disclosed in the above applications, the change or modification is to lengthen the material supply side or the span length across the composting area. However, the extent to which the conventional composting apparatus can be lengthened along the material inlet side is limited for economic and practical reasons relating to the structure and mechanical strength of the apparatus. Therefore, it is impracticable to lengthen the composting apparatus in this way. On the other hand, if it is attempted to increase the dimension in the material displacing direction, the distance through which the material is to be displaced becomes quite long.

In case the dimension is increased in the displacing direction, the number of agitation cycles must also be increased in order to move the material from the inlet side to the discharge side, and this results in excess agitation in the maturing zone and promotes undesirable cooling.

For instance, the heaped layer of the material is advanced approximately 1.5–2.5 m in general per one agitation, although each distance depends on the diameter of the paddle used for agitation and the revolutional speed of the paddle.

Also, it is generally admitted in the art that the moving distance of the heaped layer is preferably 1.5–5 m/day for the fermentation stage and 1.5–2.5 m/two days for the maturing stage. It is, therefore, preferable to maintain the moving distance of the layer within the preferable ranges above by taking into consideration effective fermentation and maturing with economical power consumption.

Other typical prior art arrangements are shown in U.S. Pat. No. 3,881,707, U.K. Pat. No. 521,894 and Swiss Pat. No. 496,600, but it is found that none of them is satisfactory to overcome the drawbacks noted above.

That is, U.S. Pat. No. 3,881,707 discloses a self-propelled vehicle for a composting operation, but it is troublesome to supply material to this vehicle for composting and there is a reduction in efficiency of the working area due to the necessity for sparing a certain space between adjacent ridges of the material through which the vehicle moves forward or backward.

Next, U.K. Pat. No. 521,894 discloses a composting apparatus of the type in which waste material to be composted is piled in a group of pyramide shaped piles, but packing down of the material into a mass is promoted at the bottom of the piles and the heat loss from the surfaces of the piles becomes large due to the increase in the total surface area of the piles. Further, it is troublesome to prepare piles or ridges of the material.

Swiss Pat. No. 496,600 discloses a composting apparatus which may be capable of processing a large volume of waste material, but the agitating operation thereof is complex.

SUMMARY OF THE INVENTION

Thus, one object of the present invention is to provide an improved composting method which is entirely free from the drawbacks of the prior art described above and which is capable of processing material on a large scale.

Another object of the present invention is to provide a composting method by which it is easy to increase composting operation capacity.

Still another object of the present invention is to provide a composting method by which treating capacity can be increased without any reduction of efficiency of the composting operation.

The above objects are accomplished according to the present invention.

A composting apparatus used in the method in accordance with the present invention essentially comprises a first reversible conveyor to which waste material to be composted is delivered by way of a material supply apparatus and two second reversible conveyors operatively connected to the first reversible conveyor at opposite end portions thereof, wherein the first and second conveyors are arranged in the form of an H-shape as seen from above, and the latter extends at a right angle relative to the former so that the entire H-shaped assembly moves throughout the composting area. In order to obviate the drawback of the prior art requiring movement of the materials over a long distance, the composting area is divided into a plurality of distinct sections arranged in rows with one row at each of the opposite sides of the first conveyor, and the material are moved back and forth within the same section by agitation at a time during the operation for that section. To ensure that the conveyed waste material is delivered to any location in a specific composting section and piled to a uniform height therein the respective end parts of the second reversible conveyors are adapted to effect a zig-zag movement which will be described below in connection with the preferred embodiment. Further, to ensure that effective agitation is conducted and that a uniformly distributed layer is formed, rotary paddles are arranged at the respective end parts of the second reversible conveyors so as to be movable in harmony with the movement of the end parts of the second conveyors, such rotary paddles being downwardly suspended from the second conveyors.

Other objects and advantageous features of the present invention will be apparent from the following description made in connection with the accompanying drawings, a brief explanation thereof being summarized below.

BRIEF DESCRIPTION OF THE DRAWINGS

FIG. 5 is a partial cross-sectional view of the composting apparatus taken along line V—V in FIG. 4;

FIG. 6 is a partial cross-sectional view of the composting apparatus taken in the direction of arrow VI in FIG. 3 and arrow R in FIG. 1;

FIG. 7 is a vertical sectional view of the apparatus taken along line VII—VII in FIG. 6, illustrating a rotary paddle and associated components;

FIG. 10 is an entire plan view of a composting area comprising 28 composting sections illustrating the relationship between the heaped state of the material and the agitation thereof;

FIG. 11 is an overall plan view of the apparatus in relation to FIG. 10;

FIG. 13 is a diagram showing another schedule;

FIG. 14 is a diagram showing a further example of the schedule;

FIG. 15 is a diagram showing another example of the schedule; and

FIG. 16 is a diagram showing still another example of the schedule.

DETAILED DESCRIPTION OF PREFERRED EMBODIMENT

Now the present invention will be described in more detail with reference to the accompanying drawings which illustrate a preferred working mode of the invention and an apparatus used therefor.

Figure 1:
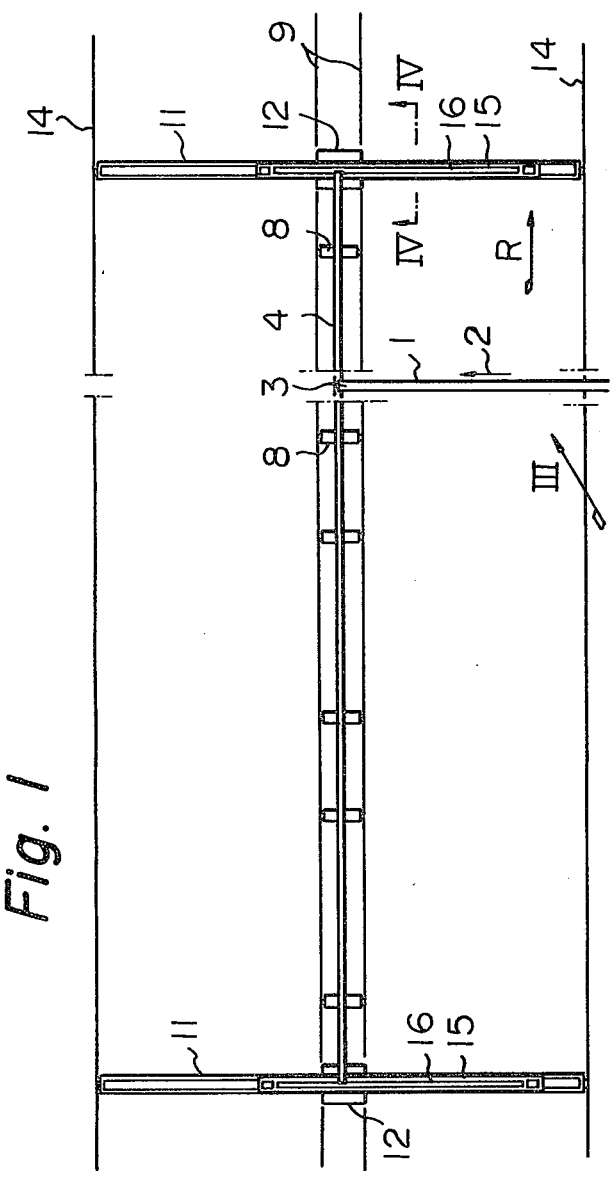
FIG. 1 is a plan view of a composting apparatus used in carrying out the method of the present invention.
Figure 2:
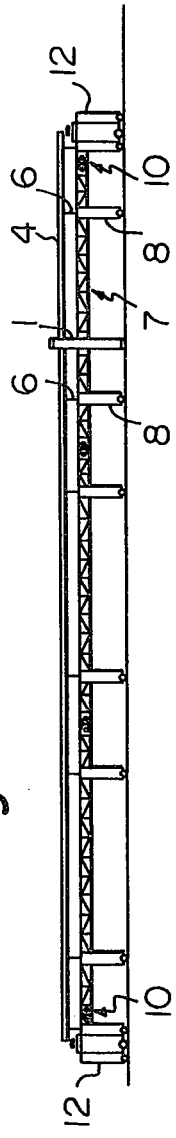
FIG. 2 is a side view of the composting apparatus in FIG. 1.
Figure 3:
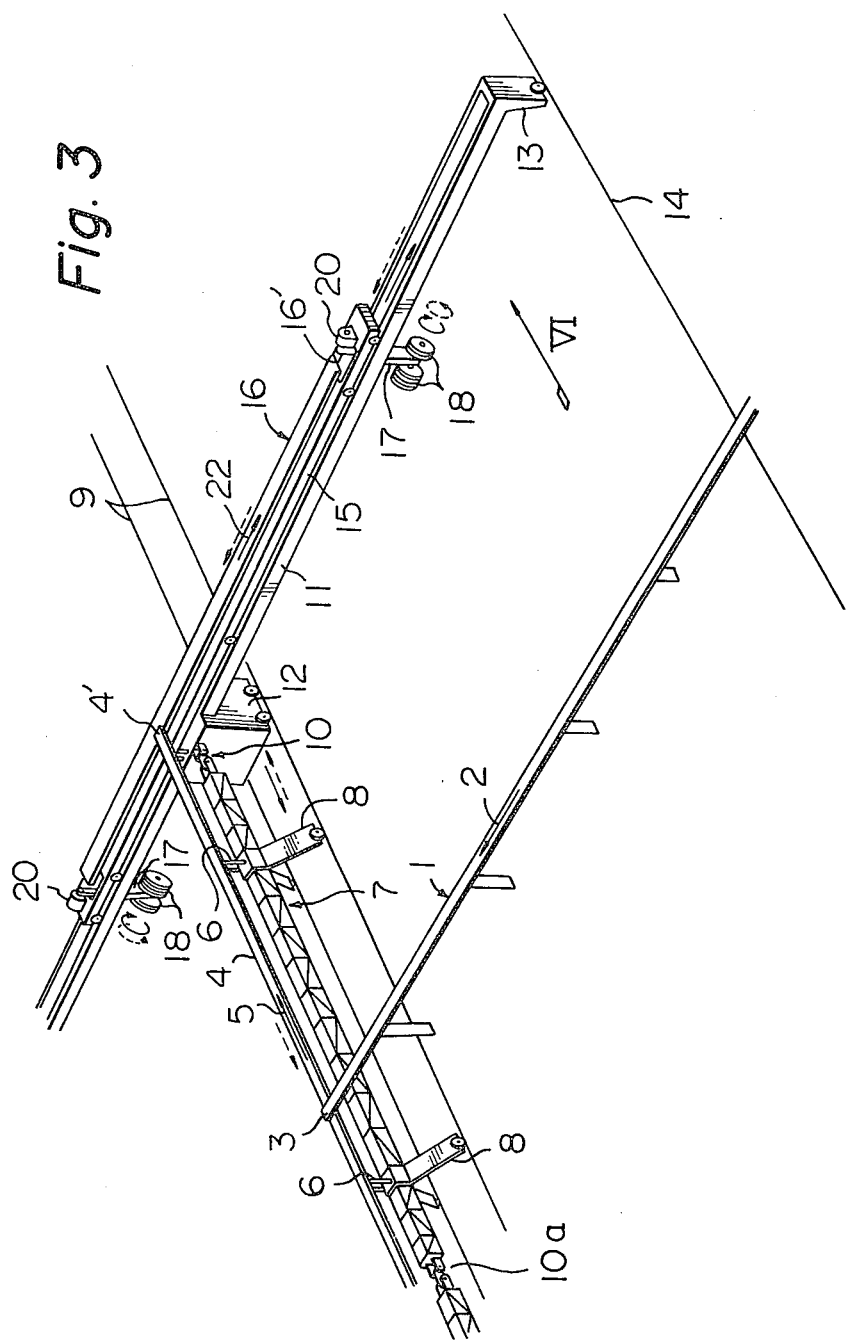
FIG. 3 is a perspective view of the composting apparatus as seen in the direction identified by arrow III in FIG. 1.
Figure 4:
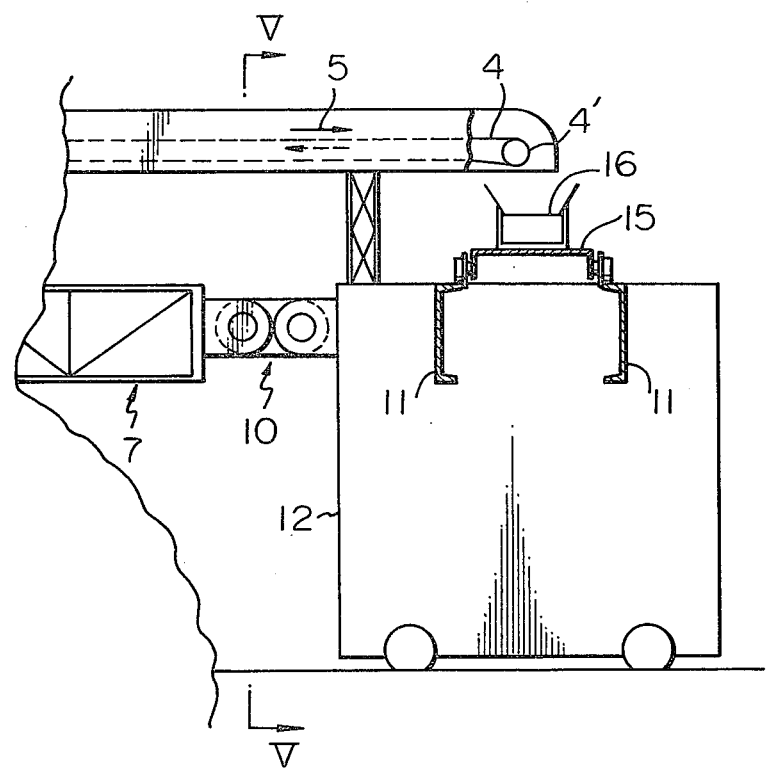
FIG. 4 is a partial cross-sectional view of the composting apparatus taken along line IV—IV in FIG. 1.
Figure 8:
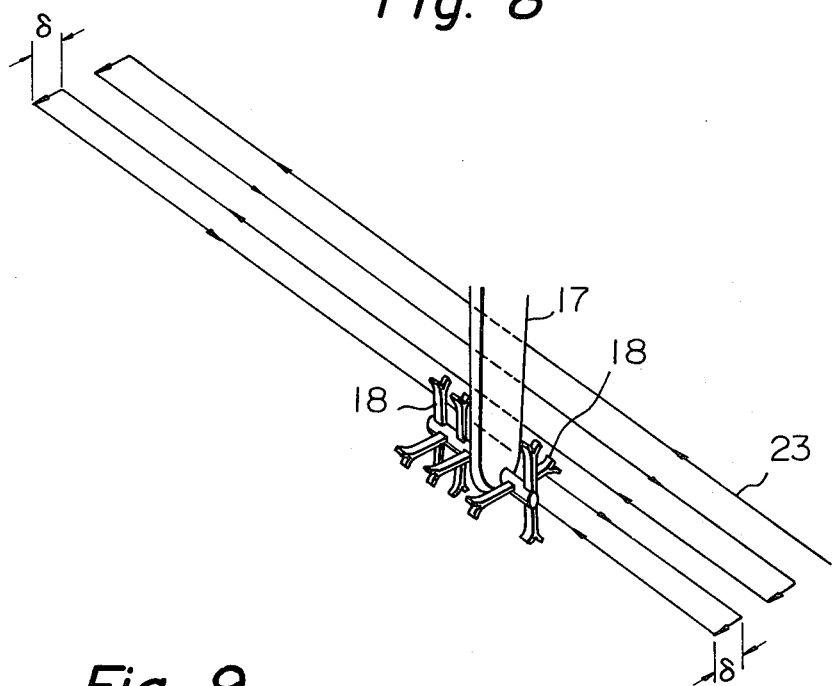
FIG. 8 is a perspective view of the rotary paddles schematically illustrating the zig-zag track of the movement thereof.

Referring first to FIGS. 1 to 3, waste material to be composted such as municipal waste, sewage sludge, livestock farming waste or other type of starting material obtained by way of subjecting the aforesaid waste materials to fermentation for a short period of time (hereinafter all the items noted being referred to merely as material) is carried in the direction designated by an arrow 2 toward the central part of the apparatus by means of a belt conveyor 1 which serves as a stationary material supply apparatus. At the end portion 3 of the conveyor 1, the material is transferred to a first conveyor 4, which is adapted to transfer material in both the rightward and leftward directions relative to the conveyor 1 as seen in FIG. 1. In the illustrated case the first conveyor 4 is transferring material in the rightward direction as designated by an arrow 5 shown in a solid line in FIG. 3. Specifically, the first conveyor 4 is mounted on a conveyor support 7 with the aid of a plurality of support columns 6 and the conveyor support 7 is in turn supported by a plurality of leg members 8 located at an appropriate distance so that it moves on rails 9 extending parallel to the first conveyor 4.

Next, the detailed structure of the respective components for the composting apparatus used in the present invention will be described in greater detail with reference to FIGS. 4 to 8.

The conveyor support 7 is connected at opposite ends thereof to two bridges 11 at the both the end parts thereof by means of joints 10 disposed therebetween, bridges 11 extending at right angles relative to the conveyor support 7. It should be noted that the total length of the conveyor support 7 may be easily extended as desired by using a coupling means such as a joint $10_a$. Each of the bridges 11 includes a central base 12 at the center thereof and end bases 13 at opposite ends thereof, the central base 12 being adapted to move on the rails 9, while the end bases 13 are adapted to move on rails 14 extending parallel to the rails 9.

An elongated carriage 15 is movably disposed on each of the bridges 11 and further a second conveyor 16 is mounted on the carriage 15 so as to be movable in opposite directions as indicated by arrows 22 in FIG. 3. Arms 17 are suspended from the carriage 15 in the vicinity of opposite ends thereof so that rotary paddles 18 are rotatably supported at such a height that they are brought close to the ground at their periphery. In the drawings reference numeral 20 designates an electric motor for driving the paddle 18 and reference numeral 21 designates a drive belt trained between the electric motor 20 and the paddle 18. In the illustrated case the second conveyor 16 is moving in the direction as identified by the solid line arrow 22. Although the paddles are illustrated as driven by the belt in FIG. 6, it is to be noted that other types of driving systems the aid of chains, gears or the like are also available.

Thus, the composting apparatus used in the present invention is constructed so that the conveyor support 7 with the first conveyor 4 mounted thereon is operatively connected with the two bridges 11 in the form of an H-shape as seen from above and the entire assembly is movable in the same direction as the direction of travel of the first conveyor 4. Further, the movable carriage 15 is reciprocably movable on the bridge 11, and the second conveyor 16 mounted on the carriage 15 is able to be reversibly operated. Thus, the carriage 15 moves at a right angle relative to the first conveyor 4 together with the second conveyor 16 and the paddles 18. A driving mechanism for driving the bridges 11 together with the conveyor support 7 as well as a driving mechanism for driving the carriage 15 may be incorporated in the central base 12.

As is apparent from the above description, material to be composted is first delivered to the first conveyor 4 by way of the conveyor 1 and, thence, in the illustrated case it is conveyed on the first conveyor 4 in the direction as identified by the solid line arrow 5 so as to be transferred onto the second conveyor 16 at the end part 4' of the first conveyor. Then the material is conveyed on the second conveyor 16 in the direction as identified by the solid line arrow 22, then it is dumped onto the rotary paddle 18 at the end part 16' of the second conveyor 16, and then it is thrown out to build up a layer of the material. The apparatus is arranged to effect a zigzag movement of the paddle 18 as identified by arrow 23 shown in FIG. 8, and therefore the continuous supply of material results in a uniformly distributed layer over the composting area. Since the arrangement is such that the material is dumped toward the paddle 18 from above, it is ensured that the supplied material is also in a uniform thickness over the composting area where the layer of the material is formed during the zig-zag movement of the paddle 18.

Figure 9:
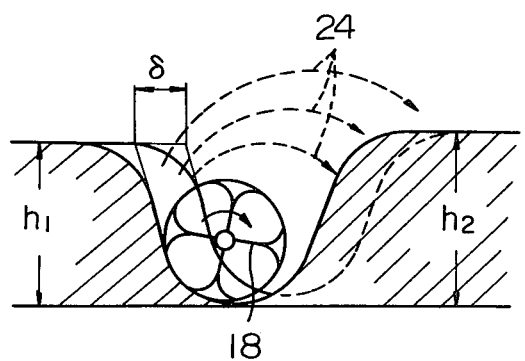
FIG. 9 is a schematic view of the rotary paddle illustrating how agitation is carried out for the heaped layer of material to be composted.

It should be noted that three other rotary paddles 18 to which no material is delivered at that time move through the already heaped layer of material while they agitate the material by throwing it substantially at a right angle relative to the direction of the movement thereof as schematically illustrated in FIG. 9. That is, assuming that a movement pitch of the rotary paddle 18 is represented by $\delta$, a volume of material in the heaped layer corresponding to the movement pitch of $\delta$ is thrown back in accordance with the path designated by reference numeral 24 so that a layer of loosened material is built up rightwardly of the paddle as illustrated in FIG. 9. Owing to the agitation carried out in the above-described manner a height $h_1$ of densely heaped material prior to agitation is increased to a height $h_2$ after the agitation, thus resulting in a substantially increased air permeability of the layer. Thus, aerobic fermentation is accelerated. Thence, as a next agitation is conducted in the opposite direction of movement and rotation of the rotary paddle 18, the result is that material is thrown in the opposite direction so that the original position of the heaped layer is restored.

Next, the relation between material supply and agitation of the total system will be described below with reference to FIGS. 10 and 11. FIG. 10 illustrates how the material is heaped with the apparatus in FIG. 11 which is omitted in FIG. 10 for the purpose of clarity of illustration. In FIG. 10, the sections bearing numerals ①  to ㉘ represent the order of days when material supplying and heaping are conducted for the respective heaping sections. Particularly, the heaping section ① shows how the material is supplied and heaped in accordance with the illustrated track. Referring to FIG. 11, the material is supplied to and heaped in the section ① in the sequence of arrows 2, 5 and 22, while three other paddles 18 conduct agitation in the respective sections ⑧, ⑮ and ㉒. By sequentially repeating the above supplying, heaping and agitating for all the sections, it is ensured in this example that agitation is conducted for all the material in each section every seven days within the heaping period of 28 days.

During the heaping of the material to be composted fermentation or maturing proceeds by way of exposure of the heaped material to air. This is assisted by blowing air from the bottom of the layer. To promote fermentation, a plurality of aeration pipes 33 (FIG. 5) are provided for the purpose of air blowing for the respective heaping sections ① to ㉘, the aeration pipes 33 being connected to a blower 30 via a distributor or controller 31 and piping 32. It should be noted that aeration is preferably conducted for promoting fermentation at the beginning stage but it is not necessarily required for the maturing operation. The controller 31 is effective to feed air to the proper sections requiring forced aeration.

In order to allow the rotary paddles 18 to be displaced from one section to another section located away from one another a vacant space as represented by chain lines 18' in FIGS. 5 and 6 is provided at a suitable position located between the support bases 12 or 13 and the heaped layer of material 25 so that the paddle 18 is free to move therethrough. When increased agitation is required for a certain reason during the period of composting operation, the vacant space serves as a passage through which the paddle is introduced to reach a specific heaping section without supplying material thereto.

Owing to the arrangement of the composting apparatus made such that a plurality of heaping sections are located on both the sides relative to the center rails 9 an increased capacity of composting treatment is ensured without any necessity for increasing the dimension of the spanning width crossing the composting area for a conventional composting apparatus and method such as disclosed in U.S. patent application Ser. Nos. 150,652 and 254,278. Further, the composting apparatus described above makes it possible to increase or reduce the number of composting sections in the direction of the central rails 9 as required. Furthermore, as described above, it is ensured that agitation is more effectively conducted in the respective composting sections by reversing the zig-zag movement of the respective rotary paddles.

The practical method carried out according to the present invention will be further explained by referring to the schematic drawings shown in FIGS. 12 through 16 wherein the direction of the movement of the apparatus is, for convenience, defined as "A": movement from the left toward the right as viewed in FIG. 10 (i.e. in a direction from the section ⑦ toward the section ① and "B": movement from the right toward the left as viewed in FIG. 10 (i.e. in a direction from the section ① toward the section ⑦).

(a) In case the agitation is effected by a cycle of one agitation per day, the following occurs.

Figure 12:
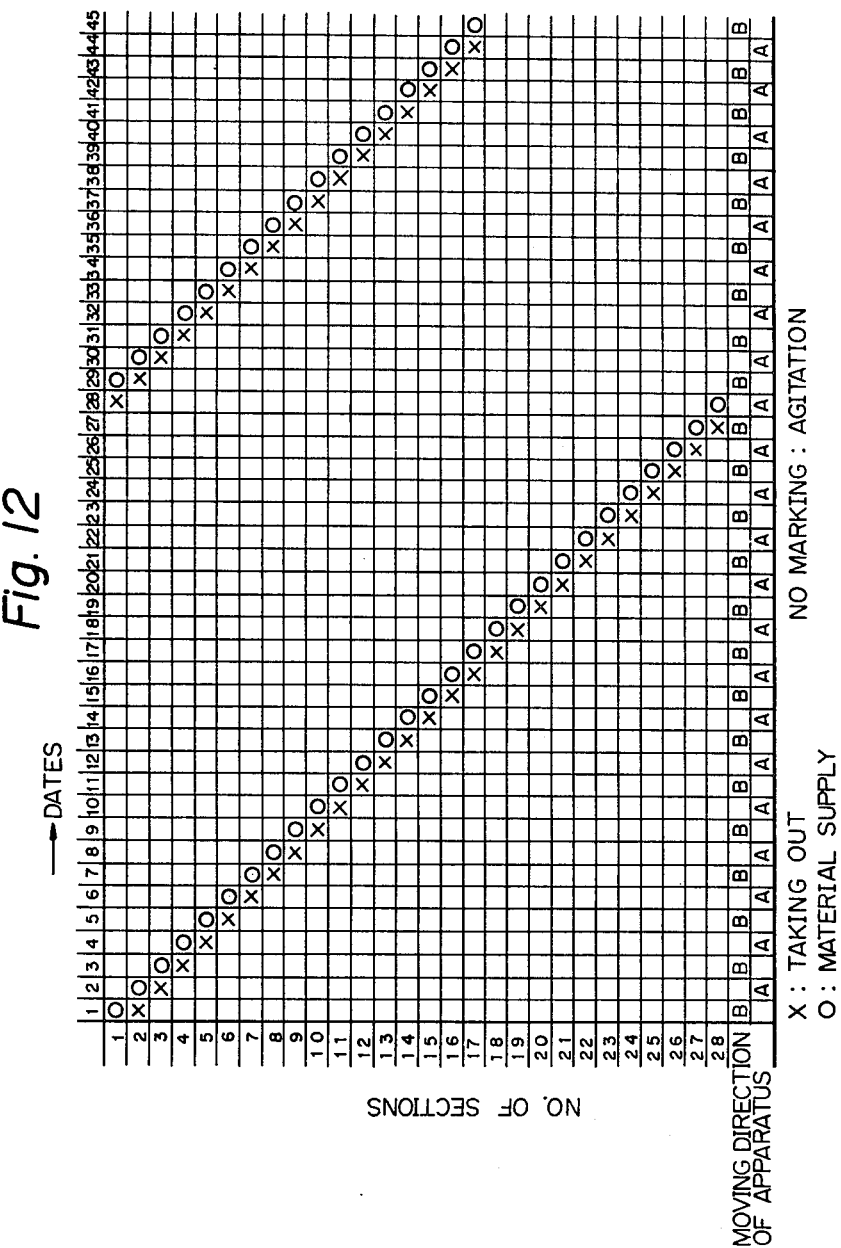
FIG. 12 is a diagram explaining one example of an operating schedule according to the method of the invention.

Referring to FIG. 12, the number of days elapsed is indicated in the horizontal direction and the section numbers are indicated in vertical direction.

On the 1st day:

The "H"-shaped assembly of the composting apparatus is moved from the section ① toward the section ⑦ in the direction of "B" as viewed in FIG. 10.

During this movement, in the section ① material is supplied, in the section ② the completed compost is taken away, and in the other sections, agitation is effected and the heaped layers are advanced in the direction "A". This situation is illustrated in FIG. 12.

While the explanation above is directed to the sections ① through ⑦, it will be readily appreciated that each of the other agitations or paddles will similarly travel in the sections ⑧ through ⑭, ⑮ through ㉑ and ㉓ through ㉘. This condition will be similar in the following cases.

On the 2nd day:

The "H"-shaped assembly is moved in the direction "A" as viewed in FIG. 10.

The completed compost in the section ③ is taken away and material is charged in the section ②. On the other sections, agitation is effected. The heaped layers are moved in the direction "B".

On the 3rd day:

The "H"-shaped assembly is moved in the direction "B" and during this movement, the completed compost is taken away from the section ④ and material is charged into the section ③.

In the remaining sections, agitation is effected and the heaped layers are moved in the direction "A". The agitation for later days is similarly effected so that the completed compost is taken away from one of the sections daily.

Figure 13:
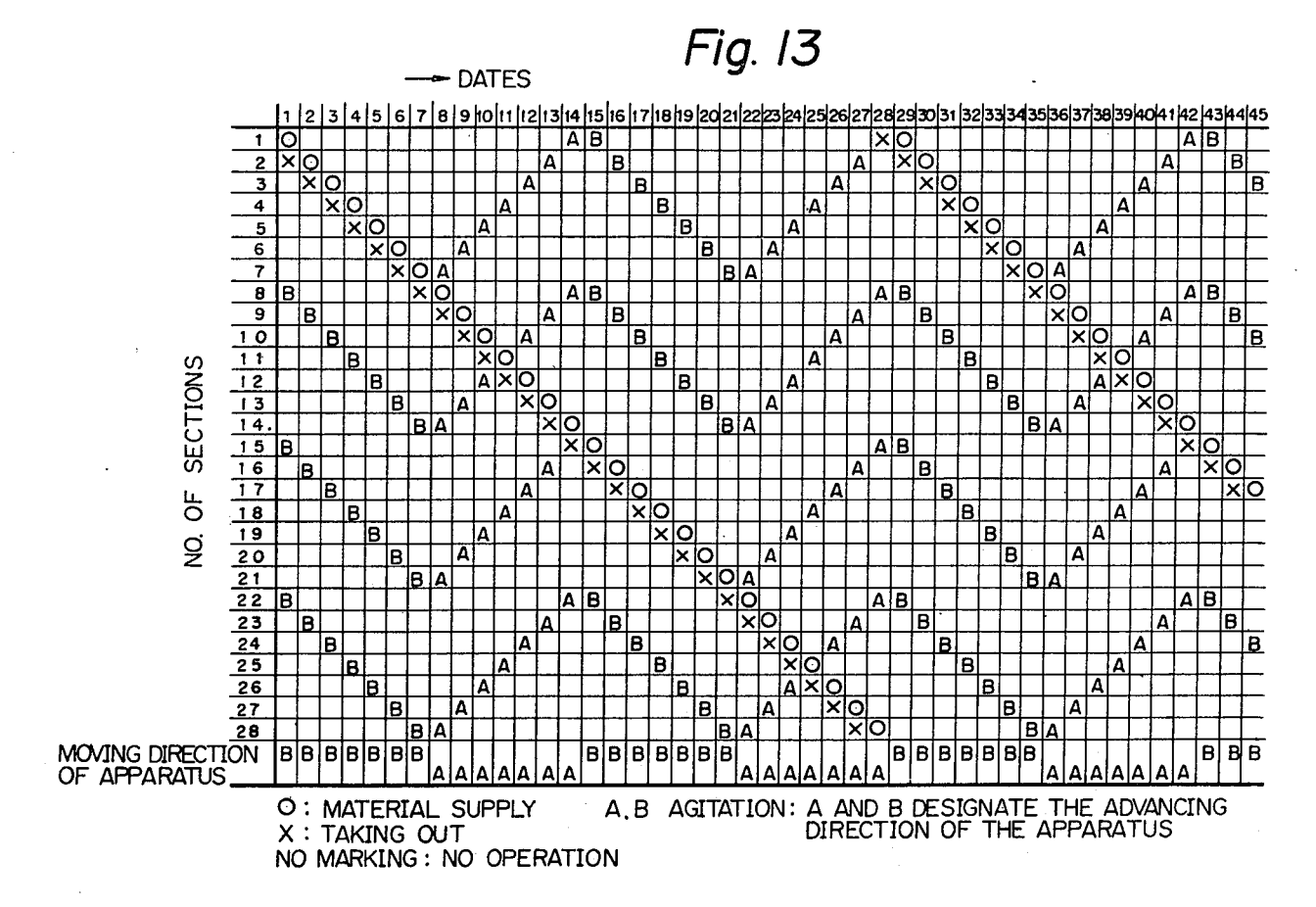
Figure 14:
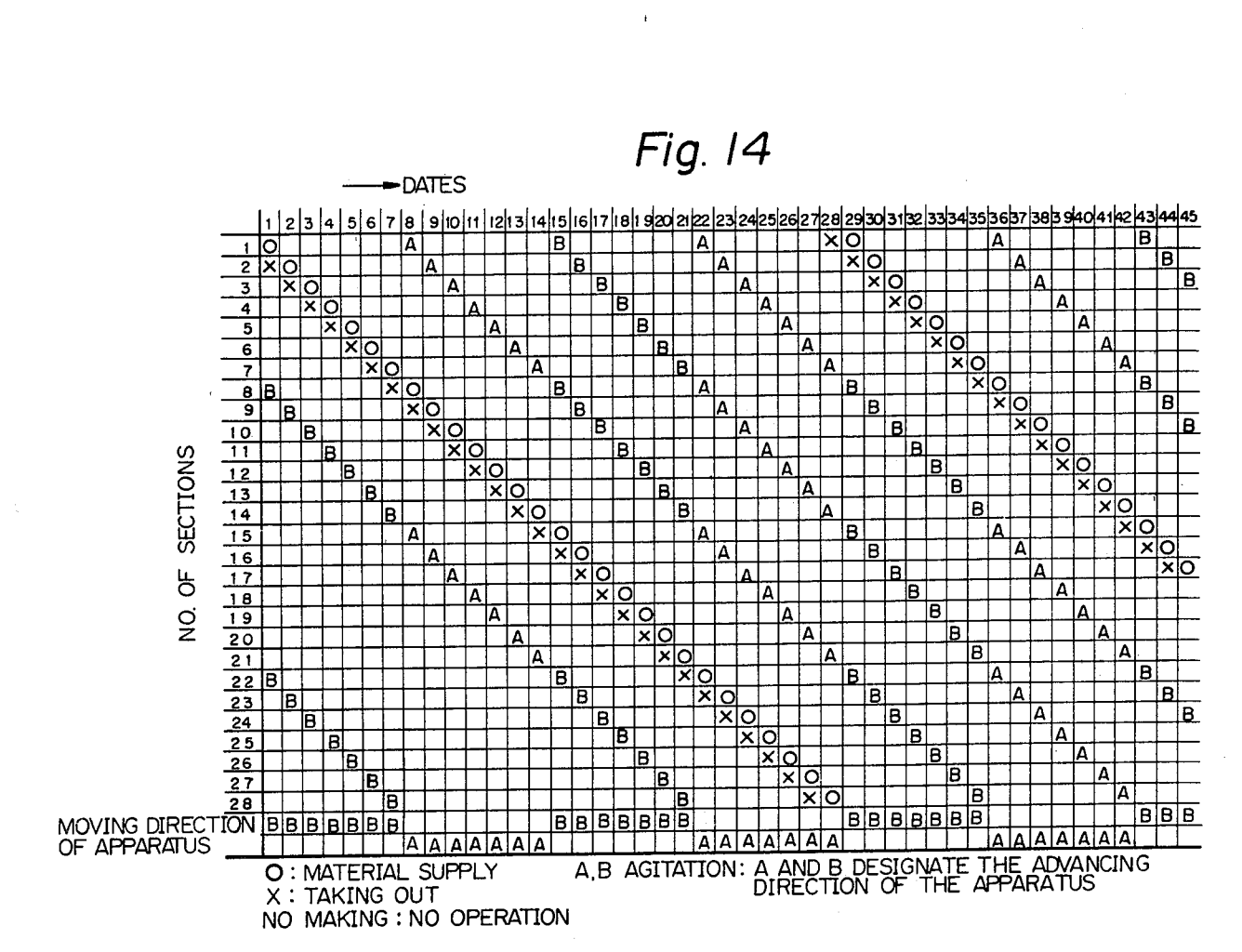
Figure 15:
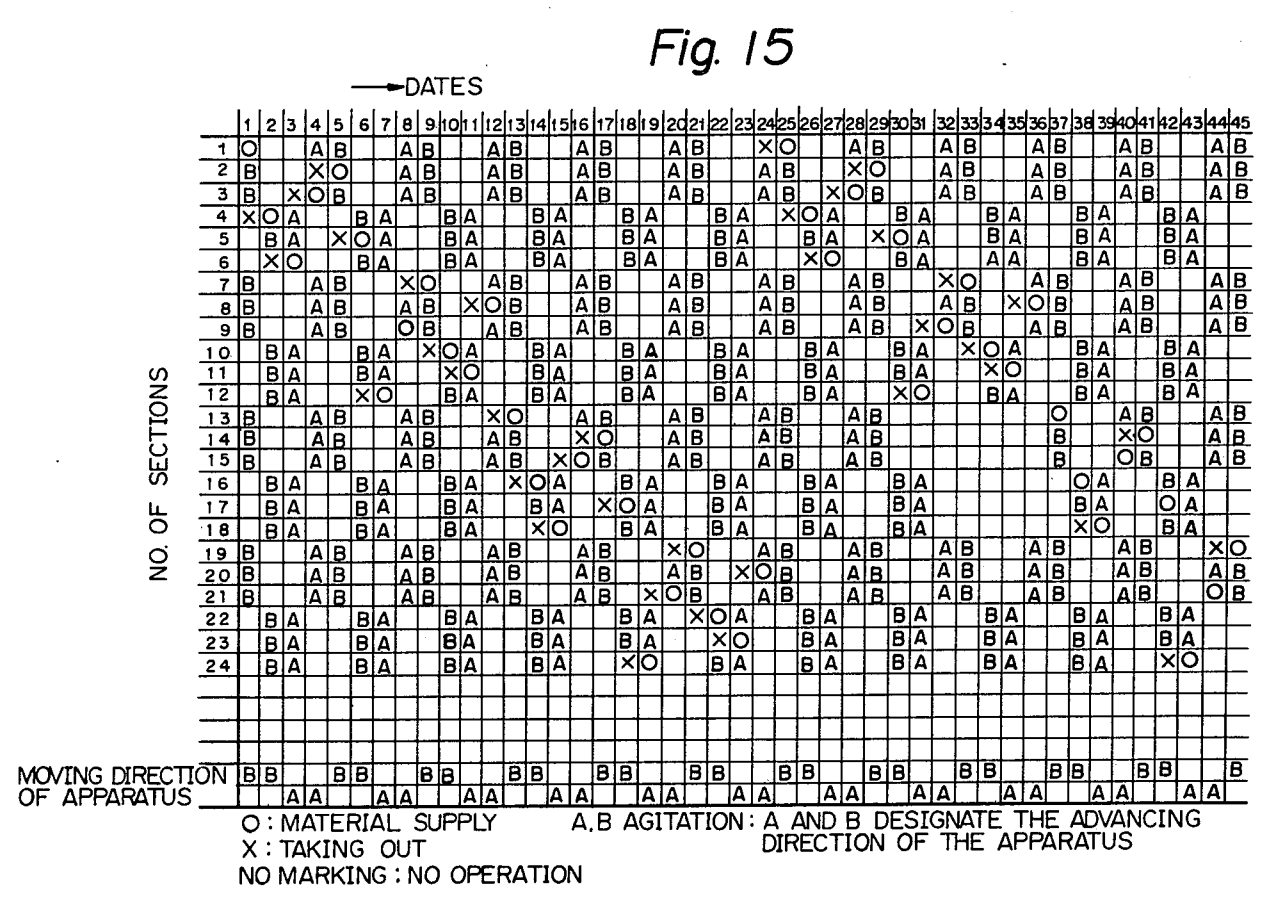
Figure 16:
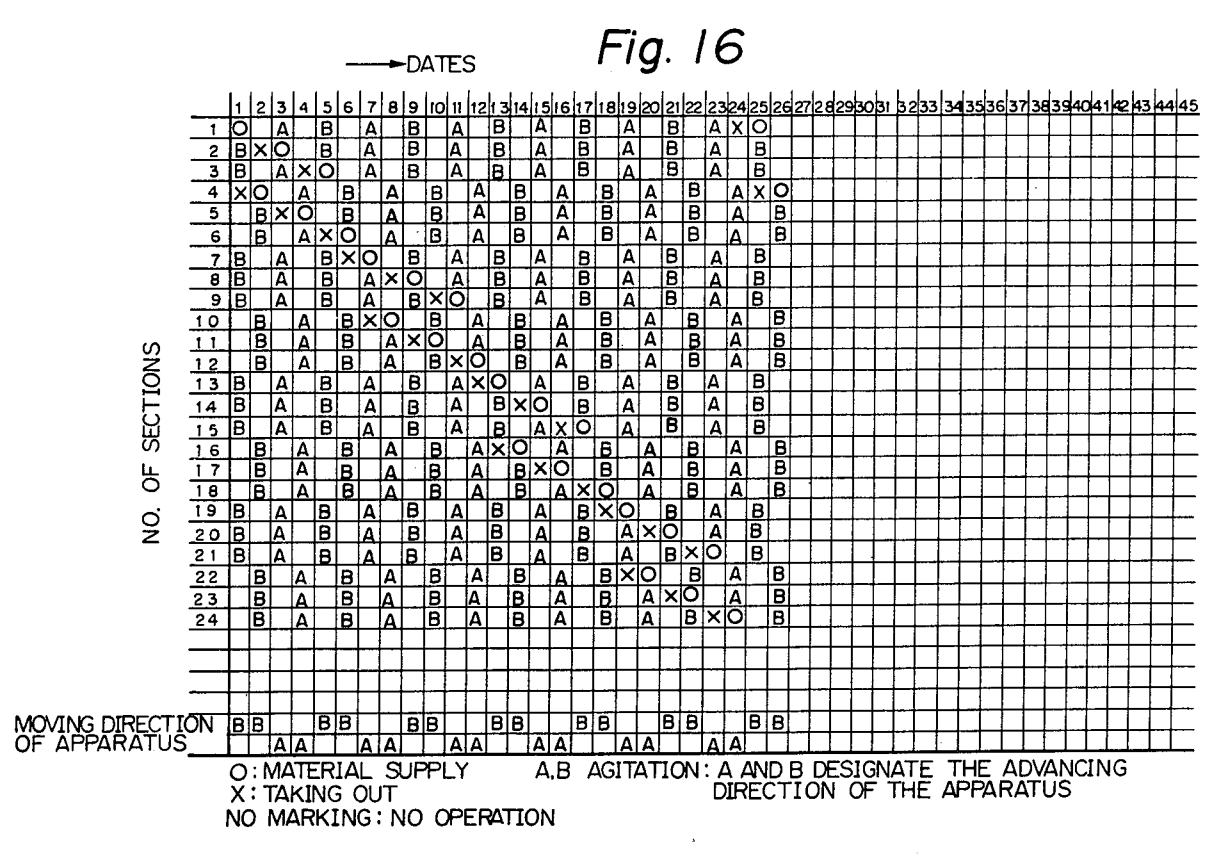

(b) In case the agitation is effected once every 7 days, several arrangements may be considered. Typical examples are illustrated in FIGS. 13 and 14. In the process shown in FIG. 13, the movement of the "H"-shaped assembly is kept to a minimum, while the agitating interval in a certain section may not be kept the same as that in the other sections. In contrast thereto, in the process according to FIG. 14, the amount of movememt of the "H"-shaped assembly is made large. However, each section will be subjected to the same agitation as that in the other sections, whereby the quality of the compost is made substantially uniform. (c) In case the agitation is effected once every two days, FIG. 15 illustrates a process wherein the movement of the "H"-shaped assembly is dept to a minimum. FIG. 16 illustrates a process wherein the intervals of the agitation are made uniform for all sections.

It should be noted that in each of FIGS. 15 and 16, the number of sections is 24.

In the foregoing process, it is noted that the materials are moved back and forth in the directions of "A" and "B", whereby the heaped layers stay substantially in the same section as that where they were charged.

As is readily understood from the above description, it is ensured that material to be composted can be heaped to a uniform height or thickness in any of the heaping sections in a wide composting area by properly controlling the moving direction and the location of the first and second conveyors and that agitation is effectively conducted for the layer of material at a certain time interval during the supplying and heaping of material in the other sections. As a result it is convenient to practice composting on a large industrial scale with the aid of a composting apparatus in accordance with the present invention.

The invention has been explained in detail referring to a specific embodiment. However, it is to be noted that the invention is not limited to that explained and that changes and/or modification thereof as would be apparent to those skilled in the art are possible within the spirit and scope of the invention defined in the claims appended herewith.

What is claimed is:

1. A composting method for processing waste material on a large scale, said method comprising the steps of:
   preparing a composting apparatus which comprises:
     a first reversible conveyor to which material to be composted is supplied from a stationary material feeder;
     a conveyor support on which said first conveyor is mounted, said conveyor support being adapted to move back and forth in the same direction as the extending direction of said first conveyor;
     elongated bridges operatively connected to said conveyor support at opposite end portions thereof, each said bridge extending at a right angle relative to said conveyor support;
     an elongated carriage disposed on each of said bridges so as to be reversibly movable on said bridge along the length thereof;
     a reversible rotary paddle suspended from each of the opposite end portions of said carriages; and
     a second reversible conveyor mounted on each of said carriages and adapted to receive material from said first conveyor, whereby zig-zag movement of said paddles is made possible;
   arranging a series of distinct composting sections in a row along the moving direction of said conveyor support at each of the opposite sides of said conveyor support;

supplying material to one of said composting sections by simultaneously rotating and moving said paddle in zig-zag fashion by the combined movement of said support and said carriages so that a uniformly heaped layer of the material is formed in said one section;

agitating simultaneously heaped layers of the material at four sections when material feeding is not being performed and agitating simultaneously three sections when material feeding is being performed to one of said sections;

removing the compost from one of the sections wherein the composting operation is completed; and repeating the above operation by shifting said support according to a predetermined schedule.

2. A method as claimed in claim 1, wherein said agitating is effected by rotating said paddles, the material being thrown, in a direction opposite to the advancing direction of the apparatus, upwardly beyond and over the respective paddles.

* * * * *